United States Patent
Li et al.

(10) Patent No.: US 9,417,760 B2
(45) Date of Patent: Aug. 16, 2016

(54) AUTO-COMPLETION FOR USER INTERFACE DESIGN

(71) Applicant: Google Inc., Mountain View, CA (US)

(72) Inventors: Yang Li, Palo Alto, CA (US); Tsung-Hsiang Chang, Medford, MA (US)

(73) Assignee: Google Inc., Mountain View, CA (US)

( * ) Notice: Subject to any disclaimer, the term of this patent is extended or adjusted under 35 U.S.C. 154(b) by 753 days.

(21) Appl. No.: 13/862,231

(22) Filed: Apr. 12, 2013

(65) Prior Publication Data

US 2013/0275892 A1 Oct. 17, 2013

Related U.S. Application Data

(60) Provisional application No. 61/624,173, filed on Apr. 13, 2012.

(51) Int. Cl.
*G06F 3/0481* (2013.01)

(52) U.S. Cl.
CPC .......... *G06F 3/0481* (2013.01); *G06F 3/04817* (2013.01)

(58) Field of Classification Search
None
See application file for complete search history.

(56) References Cited

U.S. PATENT DOCUMENTS

| | | | | |
|---|---|---|---|---|
| 2007/0157148 A1* | 7/2007 | Chang | ................. | G06F 17/5068 716/119 |
| 2007/0296615 A1* | 12/2007 | Raguseo | ............... | G06F 3/0237 341/51 |
| 2009/0030869 A1* | 1/2009 | Aharoni | ................. | G06Q 10/00 |
| 2010/0223547 A1* | 9/2010 | Wilson | .................. | G06F 3/0237 715/261 |
| 2011/0208484 A1* | 8/2011 | Ezaki | .................. | G06F 17/5045 703/1 |
| 2012/0029974 A1* | 2/2012 | Councill | ............ | G06Q 30/0206 705/7.35 |
| 2012/0198404 A1* | 8/2012 | Hasebe | ................. | G03F 7/7065 716/112 |

OTHER PUBLICATIONS

Buxton, B., "Sketching User Experiences: Getting the Design Right and the Right Design," 2007: Morgan Kaufmann, 8 Pages, Title Page, Cover Page and Table of Contents.
Cai, D., et al., "Extracting Content Structure for Web Pages based on Visual Representation," in the Fifth Asia Pacific Web Conference (APWeb2003). 2003, pp. 406-417.
Google, "Google sites" 2011, 2 pages, [online] [retrieved on Mar. 20, 2012] Retrieved from the Internet <URL:http://www.google.com/sites/help/intl/en/overview.html>.
Hartmann, B., et al., "d.tools: Visually Prototyping Physical UIs through Statecharts," in Conference Supplement to UIST 2005: ACM Symposium on User Interface Software and Technology: Demonstrations, Oct. 23-27, 2005, 2 Pages.

(Continued)

*Primary Examiner* — Tuan S Nguyen
(74) *Attorney, Agent, or Firm* — Fish & Richardson P.C.

(57) ABSTRACT

Techniques for automatically completing a partially completed UI design created by a user are described. A UI query including attributes of UI components in the partially completed UI design is created. Example designs with similar UI components are identified. UI components of one such design example are displayed to automatically complete the partially completed UI design (also called an "auto-complete suggestion"). The user can systematically navigate the design examples and accept auto-completed suggestions to include into the partially complete UI design.

20 Claims, 13 Drawing Sheets

(56) References Cited

OTHER PUBLICATIONS

Hashimoto, Y., et al., "Retrieving the Web Page Layouts using Sketches to Support Example-based Web Design," Eurographics Workshop on Sketch-Based Interfaces and Modeling, 2005, 10 Pages, can be retrieved at <URL:http://www-ui.is.s.u-tokyo.ac.jp/~takeo/papers/hashimoto-sbm2005-layout.pdf>.

Kumar, R., et al., "Bricolage: Example-Based Retargeting for Web Design," CHI 2011, May 7-12, 2011, 10 Pages, can be retrieved at <URL:http://hci.stanford.edu/publications/2011/Bricolage/Bricolage-CHI2011.pdf>.

Kumar, R., et al., "Automatic retargeting of web page content," in CHI'09 Work in Progress, Apr. 4-9, 2009. p. 4237-4242.

Lee, B., et al., "Designing with Interactive Example Galleries," in CHI'10: Perspectives on Design, Apr. 10-15, 2010, p. 2257-2266.

Lin, J., et al., "Damask: A Tool for Early-Stage Design and Prototyping of Multi-Device User Interfaces," in Proceedings of the 8th International Conference on Distributed Multimedia Systems, International Workshop on Visual Computing, 2002, 8 Pages.

Lin, J., et al., "Employing Patterns and Layers for Early-Stage Design and Prototyping of Cross-Device User Interfaces," in CHI 2008 Proceedings Activity-Based Prototyping and Software, Apr. 5-10, 2008, pp. 1313-1322.

Ritchie, D., et al., "d.tour:Style-based Exploration of Design Example Galleries," in UIST'11, Paper Session: Social Learning, Oct. 16-19, 2011, pp. 165-173.

Russell, S., et al., "Artificial Intelligence: A Modern Approach," 2 ed. 2003, 26 Pages, Title Page, Cover Page and Table of Contents.

Van Duyne, D.K., et al., "The Design of Sites: Patterns, Principles, and Processes for Crafting a Customer-Centered Web Experience," 2002, pp. 16, 19-29, and 107-109, Boston, MA, USA Addison-Wesley Longman Publishing Co., Inc.

* cited by examiner

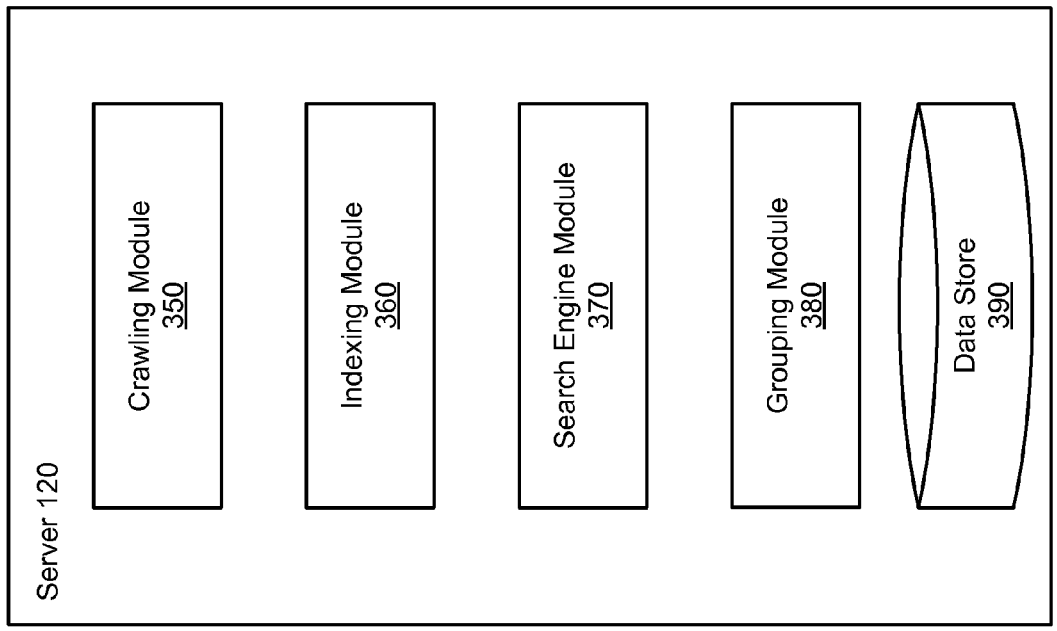
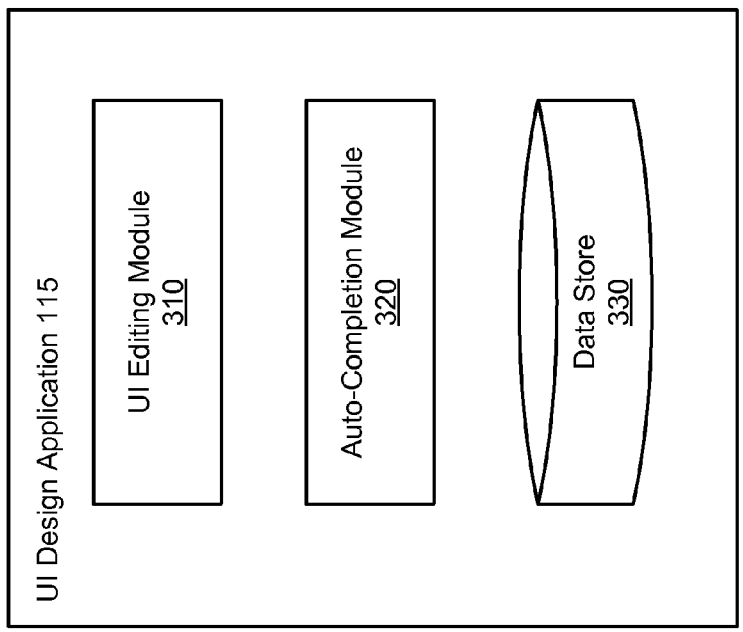
FIG. 3B
FIG. 3A

AUTO-COMPLETION FOR USER INTERFACE DESIGN

CROSS-REFERENCE To RELATED APPLICATIONS

This application claims the benefit of U.S. Provisional Patent Application No. 61/624,173, entitled "Auto-Completion for User Interface Design," filed on Apr. 13, 2012, which is hereby incorporated by reference in its entirety.

TECHNICAL FIELD

The invention generally relates to the field of user interfaces, in particular to generating content for user interfaces.

BACKGROUND

Many user interface (UI) design applications have been developed for users to create UI designs. To help users to quickly create UI designs, many UI design applications allow the users to edit or customize existing UI examples in order to create their own. However, due to the large volume of existing design examples (e.g., billions of web pages), it is difficult for the users to find desirable UI designs in the design examples. Currently, there is no effective technique for a user to effectively and easily leverage existing design examples to create their own UI designs.

SUMMARY

Embodiments of the present disclosure include methods (and corresponding systems and computer program products) for automatically completing a partially completed user interface design created by a designer.

In one aspect, a command is received to automatically generate a complete design from an incomplete UI design that includes a first UI component. A plurality of example designs are identified that contain a second UI component similar to the first, and a third UI component from the example design is provided for display in the incomplete UI design. Scrollbars are provided for selection of one of the plurality of example designs and the third component is incorporated with the incomplete design upon user confirmation.

In another aspect, a combination score categorizing similarity between example designs is used to group the example designs.

In still another aspect, the example designs are grouped based on properties including layout style, background style, background color, font size, and font style.

In a further aspect, an incomplete UI includes a first set of UI components. A plurality of example designs is identified, each with a second set of UI components that are similar to the first set, and an additional UI component. A corresponding transformation cost is calculated for each of the design examples. The design examples are presented and user controls provided whereby a user selects and confirms an additional component to incorporate with the incomplete UI design.

In yet another aspect, the transformation cost comprises contributions from one or more of the following factors: a cost associated with adding a UI component, a cost associated with deleting a UI component, a cost associated with translating a UI component, and a cost associated with scaling a UI component.

A related method receives a command to automatically generate a design for an incomplete UI design comprising a user-selected component. A design example including a corresponding UI component and a recommended UI component is identified, and the recommended UI component is provided for display in the incomplete UI design.

In one aspect of the related method, differences between text and images in the user-selected and corresponding UI components do not contribute to the transformation cost. In another aspect, text and images in the recommended UI component are replaced by default text and images when provided for display.

Another related method determines attributes of UI components in a plurality of design examples, receives a query for automatically generating a design for the incomplete UI, the query including information about a first set of UI components of the incomplete UI, and identifies a design example that has a second set of UI components, similar to the first set of UI components, and also has a third UI component for proposed inclusion in the incomplete UI design.

System elements identify and harvest the design examples, and group them based on common characteristics.

In yet another aspect, a partially completed UI is compared to a corpus of examples and a subset of the examples is selected based on a similarity between the partially completed UI and the UI of each example selected for the subset. UI components present in one or more of the examples that do not correspond to a component in the partially completed UI are ranked based on the number of examples that contain a comparable component (e.g., one that is identical, or substantially the same). For example, if five examples are identified as similar to the partially completed UI, and four of them contain a radio-button in the top-right hand corner, then such a radio-button component will be highly ranked. In contrast, a text box which only appears at the bottom of one of the examples will be lowly ranked. Highly ranked components are favored over lower ranked components for presentation to the user as auto-complete options. For example, the user may be presented with the highest ranked component for inclusion and be given the option to insert it, move on to the next highest ranked suggestion, or continue to add components manually.

In a related aspect, complete UI designs are ranked and presented to the user based on a number of UIs in the example corpus that have substantially the same components in substantially identical positions.

In yet a further aspect, a user is provided with controls to select a portion of an incomplete UI and a comparison is made between the selected UI portion and corresponding UI portions from the example corpus (e.g., portions in example UIs with the same co-ordinates as the selected portion). Candidate components for inclusion in the UI portion are presented to the user based on the comparison with corresponding portions in the example corpus. In this way, a user can base different portions of a UI on different example UIs from the example corpus, thereby enabling easy combination of designs and allowing greater creativity.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the disclosed subject matter.

BRIEF DESCRIPTION OF THE DRAWINGS

FIG. 3A is a high-level block diagram illustrating modules within a UI design application shown in FIG. 1 according to one embodiment.

FIG. 3B is a high-level block diagram illustrating modules within a server shown in FIG. 1 according to one embodiment.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
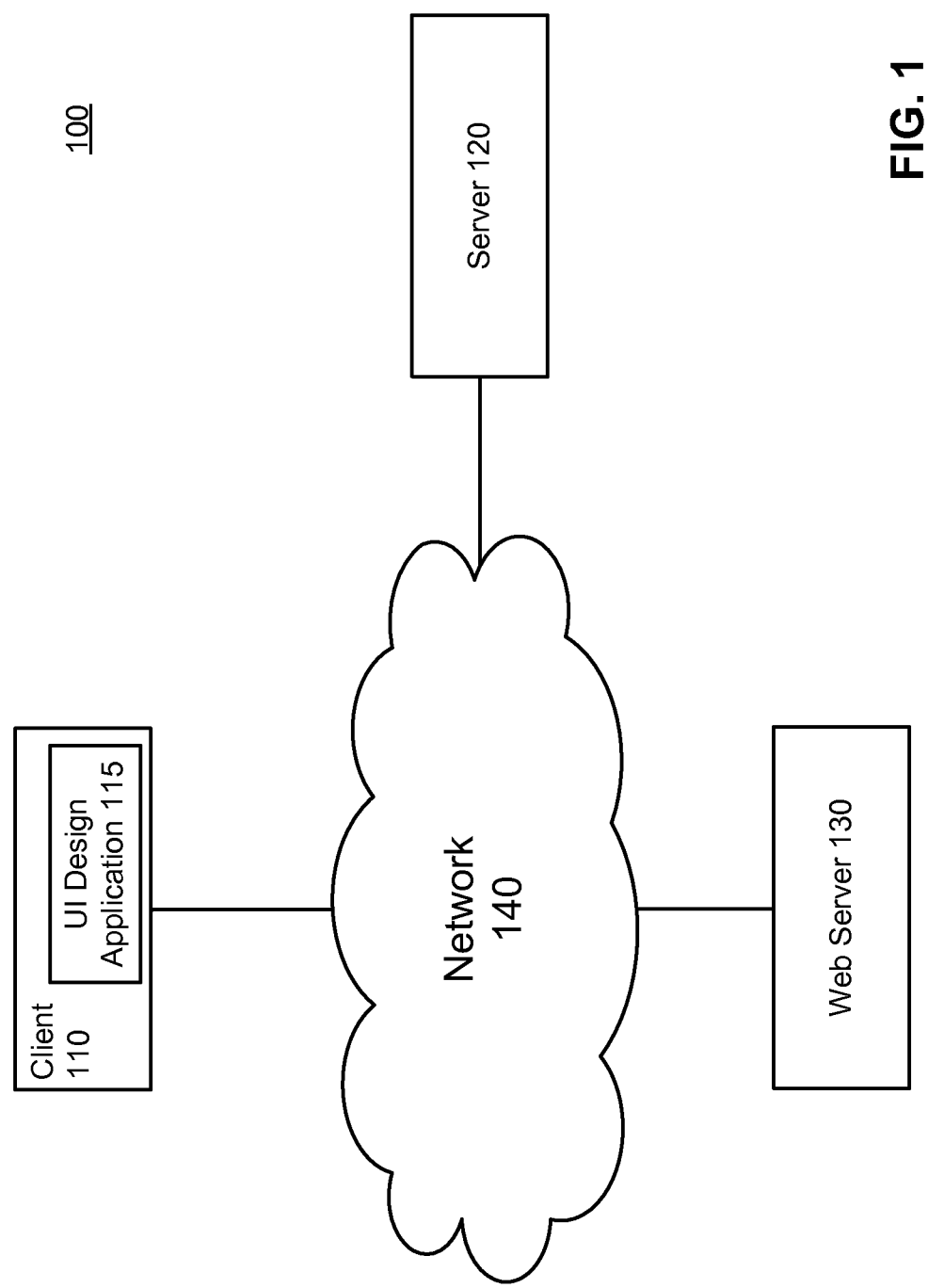
FIG. 1 is a high-level block diagram of a computing environment according to one embodiment.

FIG. 1 is a high-level block diagram that illustrates a computing environment 100 for enabling a user to efficiently create a UI design by automatically completing a partially completed UI design created by the user using design examples and enabling the user to incorporate desirable designs from the design examples into the UI design. As shown, the computing environment 100 includes a client 110, a server 120, and a web server 130, all connected through a network 140. There can be other entities in the computing environment 100.

The client 110 is an electronic device that can communicate with the server 120 through the network 140. In one embodiment, the client 110 is a conventional computer system executing, for example, a Microsoft Windows-compatible operating system (OS), Apple OS X, and/or a Linux distribution. In another embodiment, the client 110 is a mobile device such as a smart phone or a tablet computer executing, for example, a GOOGLE ANDROID operating system (OS). As shown, the client 110 includes a UI design application 115.

The UI design application 115 is a software program intended to be used by a user (also called the "designer") to create UI designs such as web pages and applications (or apps). A UI design is a visual presentation of digital information. A UI design includes one or more components (also called "UI components") such as regions, texts, images, and buttons. A UI component itself may include one or more UI components. The former is called the parent UI component and the latter are called the children UI components. For example, a region (the parent UI component) may include multiple buttons (the children UI components). The arrangement of UI components within a UI (or a parent UI component) is called the layout of that UI. Each UI component has attributes that collectively define the display of the UI component in the UI design it belongs to. Example attributes include location, length, height, size, type, background color, font, semantic information and layout.

The UI design application 115 provides an auto-completion feature that automatically completes a partially completed UI design created by a designer. As the designer freely lays out UI components on an editing window (also called a "canvas"), the UI design application 115 automatically suggests the rest of the UI design (also called the "alto-complete suggestions") by rendering a suggested design on the canvas along with the UI components added by the designer. The designer can either ignore the suggested layout and keep finishing the design, or accept the suggested design as a part of the UI design. In addition, the auto-completion feature suggests additional alternative designs for the partially completed UI design by enabling the designer to select a region and systematically navigate through design examples for that region and selectively incorporating desirable designs identified by the designer into the UI design.

In order to provide the auto-complete suggestions for a UI design, the UI design application 115 generates a UI query that includes attributes of the existing UI components in the partially completed UI design. The existing UI components include the UI components added by the designer and the UI components suggested by the UI design application 115 and accepted by the designer. The UI design application 115 submits the UI query to the server 120 and receives a collection of design examples from a corpus of UI designs, each of the received design examples from the corpus including UI components similar to the existing UI components. The UI design application 115 fills the partially completed UI design using UI components in one of the received design examples, and enables the user to select regions in the resulting UI design and view alternative designs for the selected regions. The user can choose to incorporate the suggested designs for one or more regions in the UI design by accepting (or confirming) the desired suggestions, or ignore the auto-complete suggestions altogether and completing the UI design manually. In one embodiment, the UI design application 115 ranks the suggestions based on how many examples in the corpus exhibit similar UI design features.

The server 120 is a hardware device and/or software program configured to communicate with the client 110 and the web server 130 through the network 140. The server 120 creates a design example corpus by retrieving contents such as web pages hosted on the web server 130 and indexes the contents in an index against UI components included therein. The server 120 receives UI queries from the client 110 regarding UI designs and searches in the index for design examples containing UI components similar (e.g., location, background color, and/or font) to the existing UI components specified in the UI queries. The server 120 scores each design example in the search results by calculating a minimum transformation cost for transforming the existing set of UI components specified in the UI query into a corresponding set of UI components in the design example, which may involve operations such as adding, deleting or geometrically transforming (translation and/or scaling) one or more UI components.

In one embodiment, the minimum transformation cost is a value between the range of 0 and 1, with a small value indicating a high degree of similarity (i.e., less transformation operations necessary) and a high value indicating a low degree of similarity. The server 120 removes the design examples with minimum transformation costs exceeding a predetermined threshold value from the search results, and returns the remaining design examples to the client 110. The web server 130 is a hardware device and/or software program configured to deliver contents such as web pages over the network 140. In an alternative embodiment, a pre-selected number (N) of design examples are returned to the client 110. The server 120 selects the N design examples with the lowest minimum transformation cost, i.e. those with the greatest degree of similarity.

The network 140 is a system of interconnected computer networks that use standard communications technologies and/or protocols to facilitate data transmission among the computer networks. Thus, the network 140 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), JavaScript, VBScript, Flash, PDF, PostScript, etc. In addition, all or some of links can be encrypted using conventional encryption technologies such as secure sockets layer (SSL), transport layer security (TLS), virtual private networks (VPNs), Internet Protocol security (IPsec), etc. In some embodiments, the entities use custom and/or dedicated data communications technologies instead of, or in addition to, the ones described above.

Computer Architecture

Figure 2:
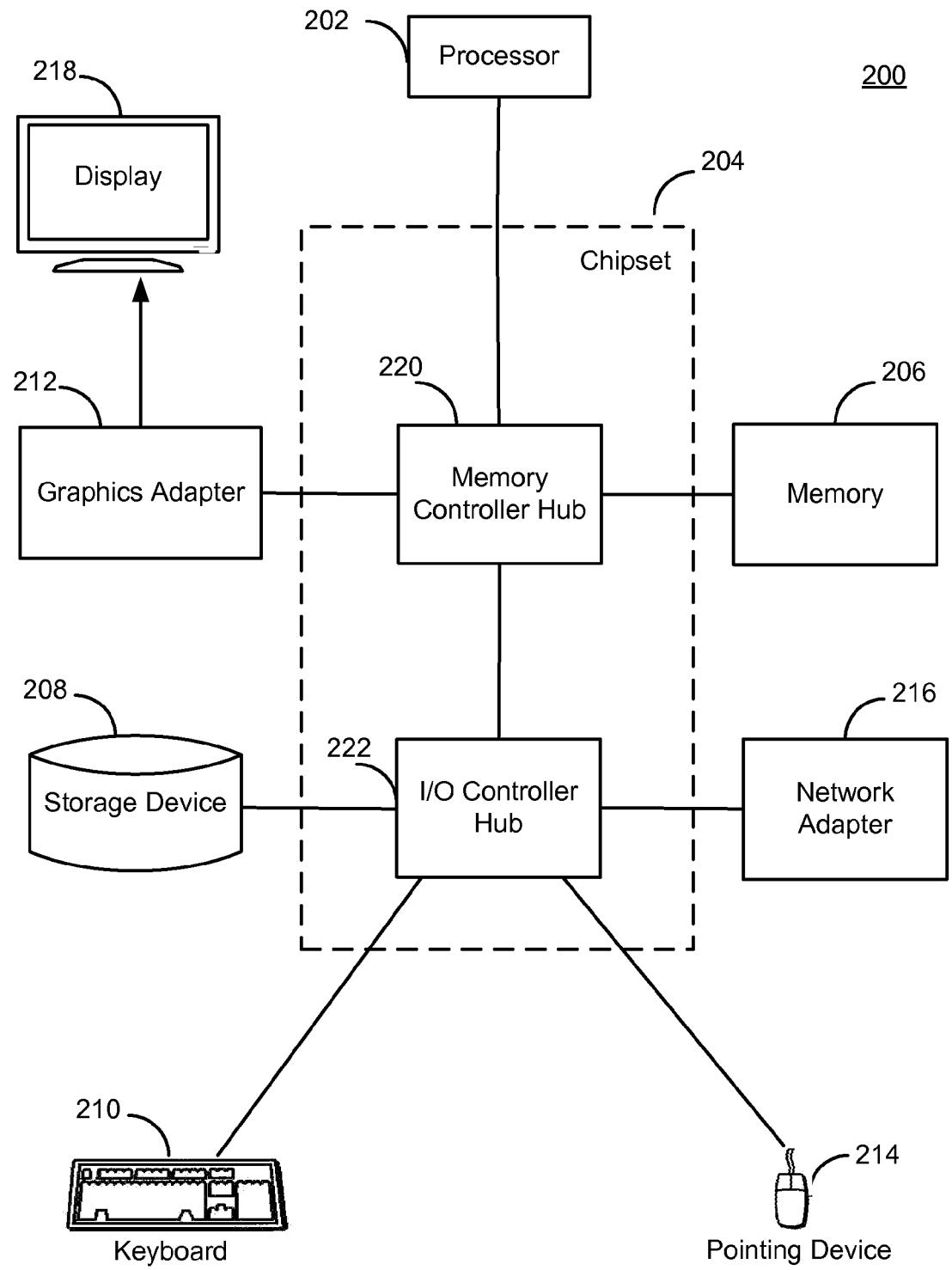
FIG. 2 is a high-level block diagram illustrating an example of a computer for use in the computing environment shown in FIG. 1 according to one embodiment.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the server 120 might comprise multiple blade servers working together to provide the functionality described herein. The computers 200 can lack some of the components described above, such as keyboards 210, graphics adapters 212, and displays 218.

Example Architectural Overview if the UI Design Application

FIG. 3A is a high-level block diagram illustrating a detailed view of modules within the UI design application 115 according to one embodiment. Some embodiments of the UI design application 115 have different and/or other modules than the ones described herein. Similarly, the functions can be distributed among the modules in accordance with other embodiments in a different manner than is described here. As illustrated, the UI design application 115 includes a UI editing module 310, an auto-completion module 320, and a data store 330.

Figure 5A:
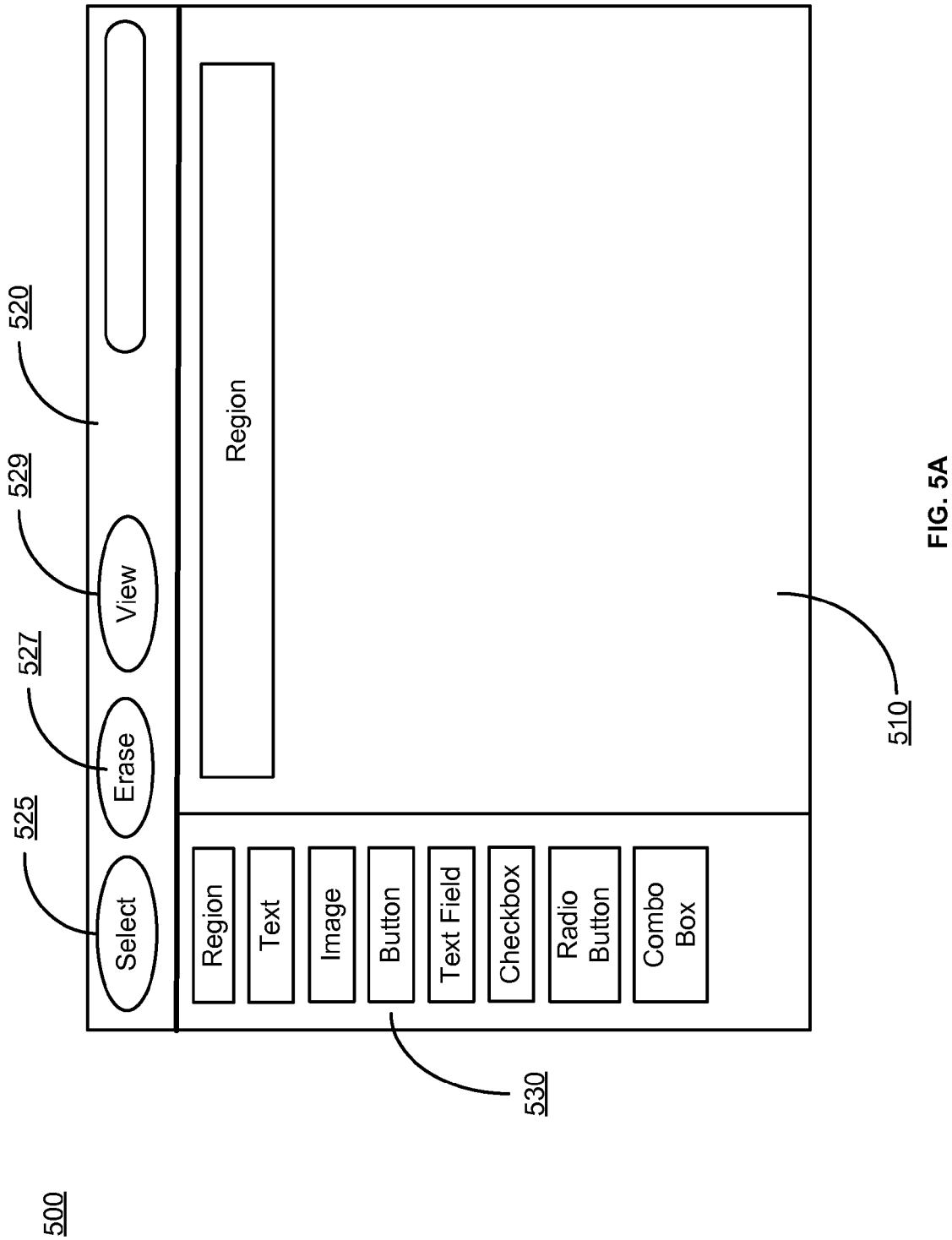
FIGS. 5A through 5G are diagrams illustrating displays of the UI design application shown in FIG. 1, according to one embodiment.

The UI editing module 310 displays a window on a display of the client 110. The window includes an editing window (also called a "canvas", a "working area") along with a component menu listing UI components that the user can add onto a UI design. The window also includes an auto-completion menu with commands for the user to accept or erase the auto-completion suggestions. An example window 500 is illustrated in FIG. 5A. As shown, the example window 500 includes a canvas 510, a component menu 530, and an auto-completion menu 520. The auto-completion menu 520 includes a suggestion selection button 525, an erase button 527, and a view button 529. The selection button 525 confirms the currently suggested design, making the suggested UI components part of the UI under development. The erase button 527 removes a suggested design, resulting in another suggested design (if available) being presented. The view button causes the original design from the corpus that the suggested design is based on to be displayed to the designer. In one embodiment, the UI components in the original design that correspond to the existing UI components (and resulted to the design being suggested) and/or the UI components that are being recommended are visually highlighted (e.g., by outlining them in green and red respectively).

Referring back to FIG. 3A, the auto-completion module 320 automatically completes a partially completed UI design created by the designer and enables the designer to selectively incorporate suggested designs into the UI design. When the UI editing module 310 receives user inputs creating a partially completed UI design, the auto-completion module 320 generates a UI query including attributes of existing UI components in the partially completed UI design, transmits the UI query to the server 120, and retrieves a set of design examples containing suggested designs for completing the partially completed UI design from the server 120. The auto-completion module 320 selects a design example in the set and fills the partially completed UI design with UI components of the selected design example. In one embodiment, the auto-completion module 320 analyzes the design examples and groups examples that are substantially similar, e.g., those that have the same UI components arranged in approximately the same layout. These groups of examples are then ranked based on the number of examples included in each, and the highest ranked group (e.g., the group comprising the greatest number of design examples) is presented to the designer as a suggestion first, with lower ranked groups being presented if the designer rejects the first-presented suggestion.

Figure 5B:
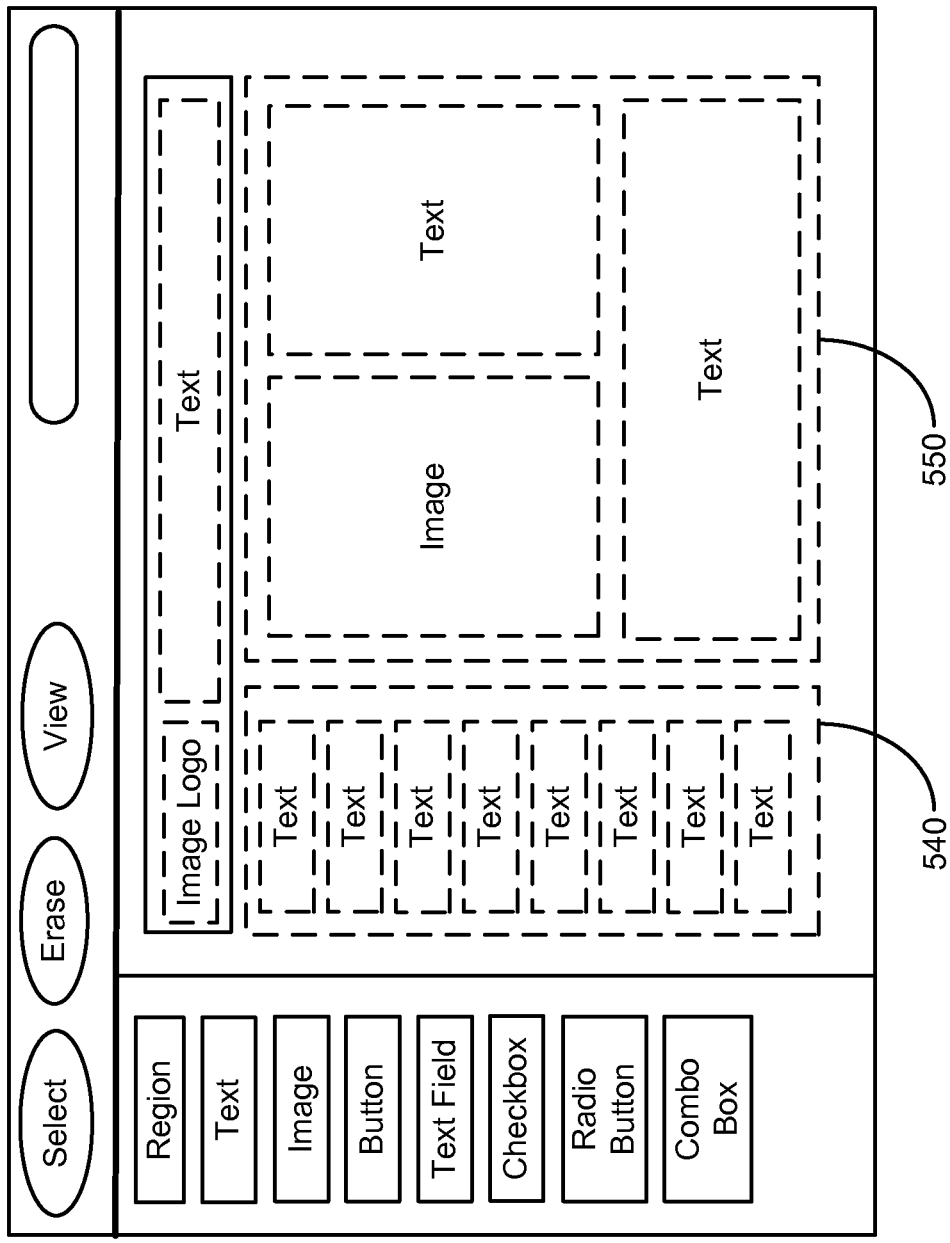

FIG. 5B illustrates an automatically completed UI design. As shown, the existing UI components and the suggested UI components are visually distinguishable: the existing UI components are in solid lines and the suggested UI components are in dotted lines. Other methods of visually distinguishing existing and suggested UI components may be used.

Figure 6:
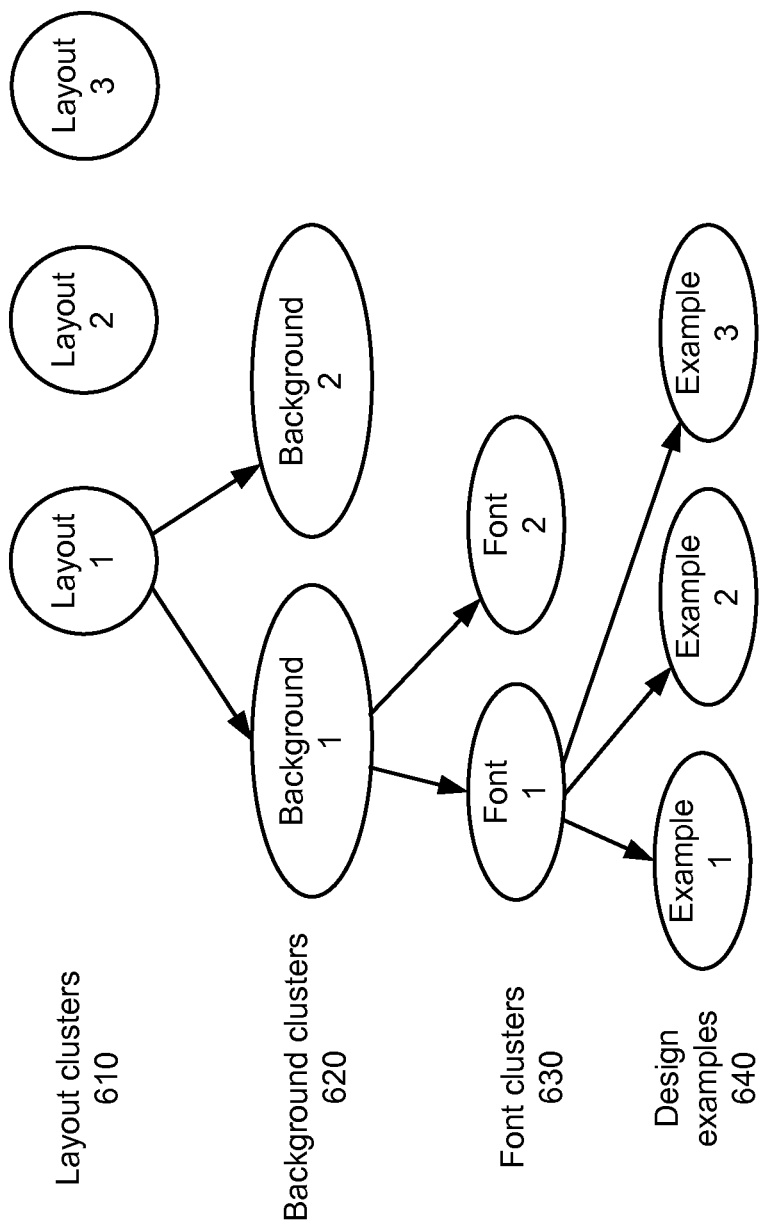
FIG. 6 is a diagram illustrating a structure of grouped design examples, according to one embodiment.

In one embodiment, the UI components in the retrieved design examples are grouped into different regions (e.g., regions 540 and 550 in FIG. 5B), and the retrieved design examples are grouped (and/or sub-grouped) according to their design similarities in terms of attributes such as layout, color, and font in these regions. FIG. 6 illustrates an example organization of the retrieved design examples for one such region. As shown, the design examples are grouped into different layout groups or clusters 610 according to their similarity in the layouts of UI components contained in the region. Additional details about how the design examples are grouped into the layout groups are provided below with regard to the server 120. Within each layout group, the design examples are further grouped into different background groups 620 according to their similarities in the backgrounds (e.g., background color) of said region. Within each background group, the design examples are further grouped into different font groups 630 according to their similarities in their text fonts (e.g., size, style) of said region. Each group (or subgroup) has one or more representative design examples 640.

Figure 5C:
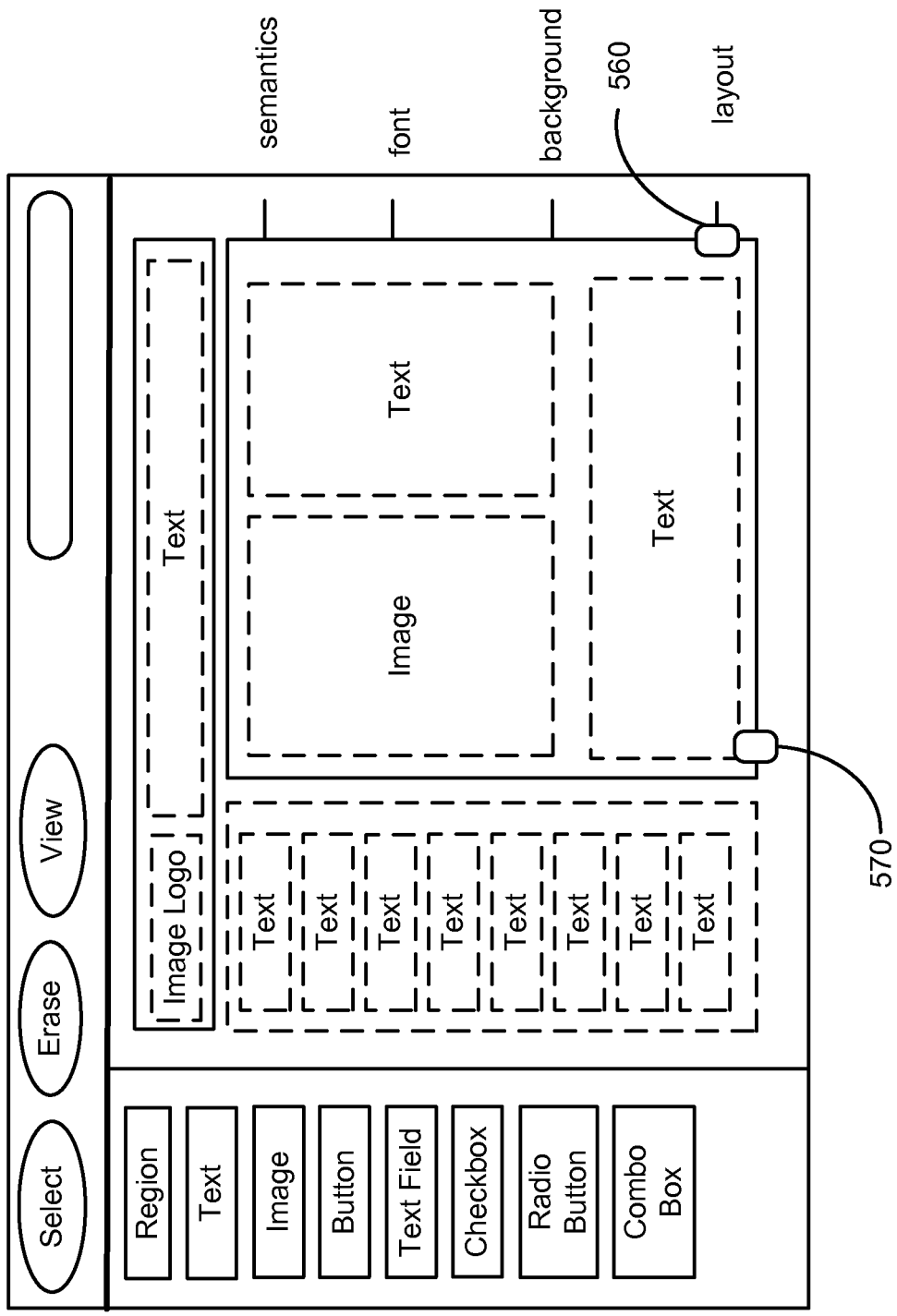
Figure 5D:
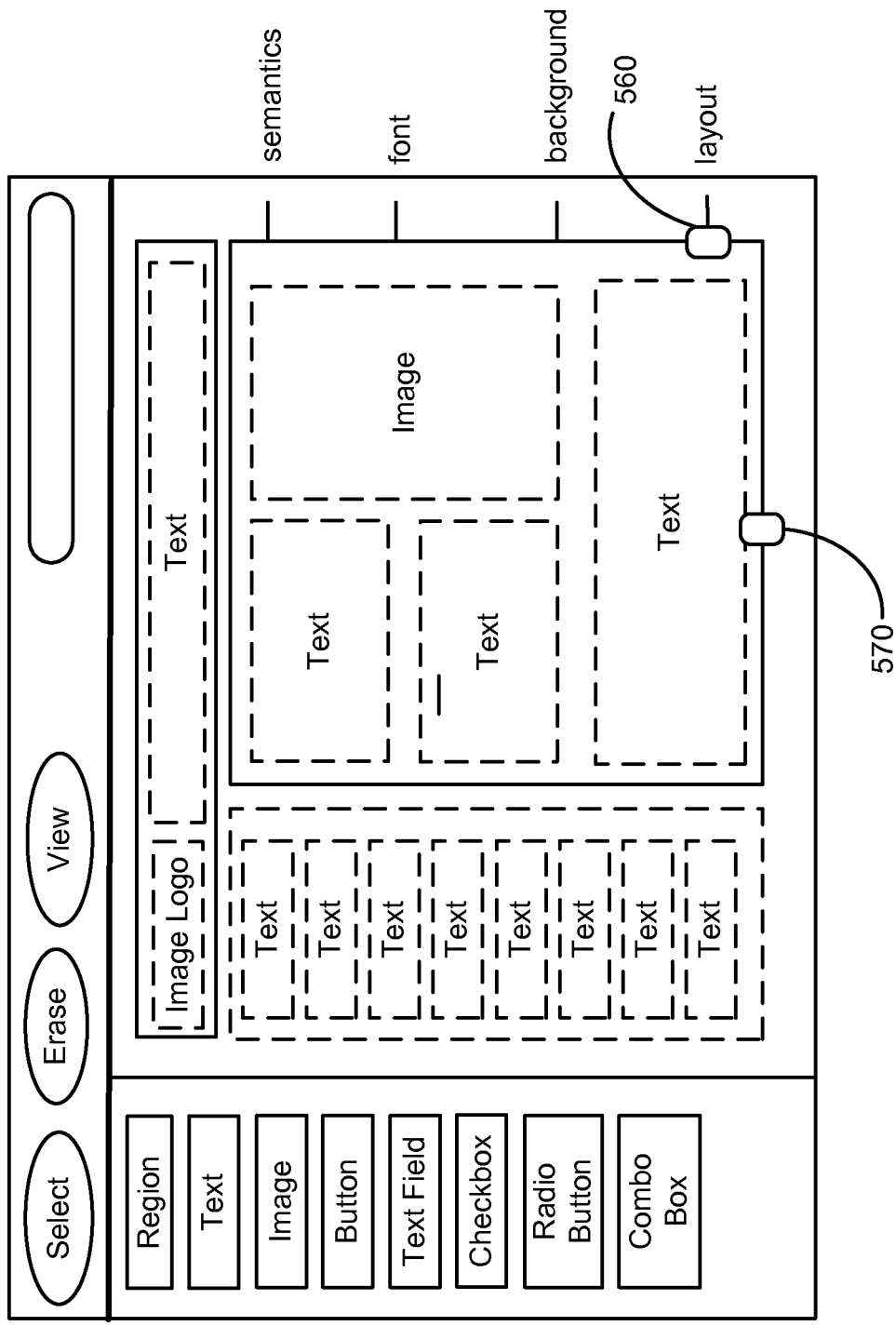
Figure 5E:
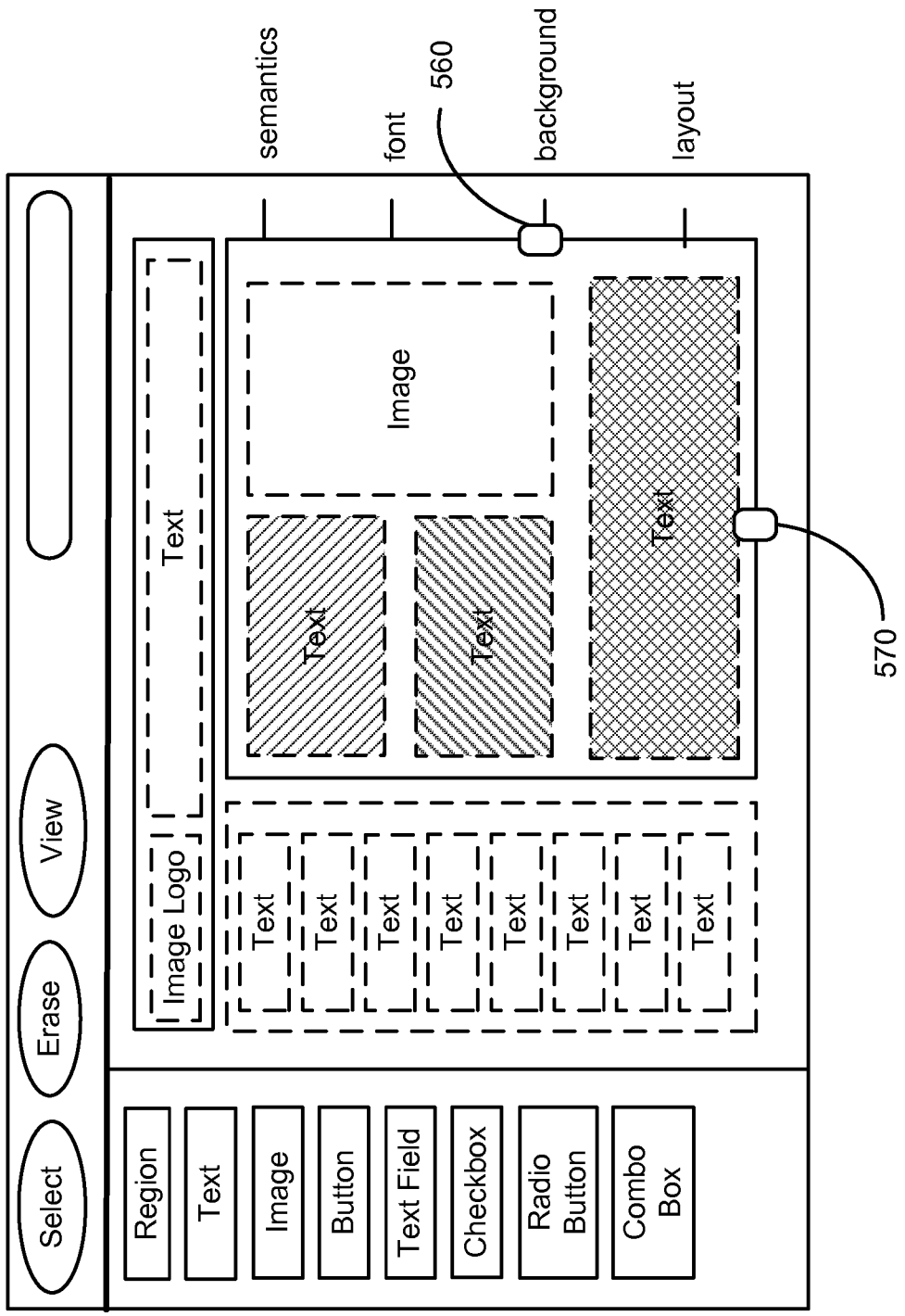
Figure 5F:
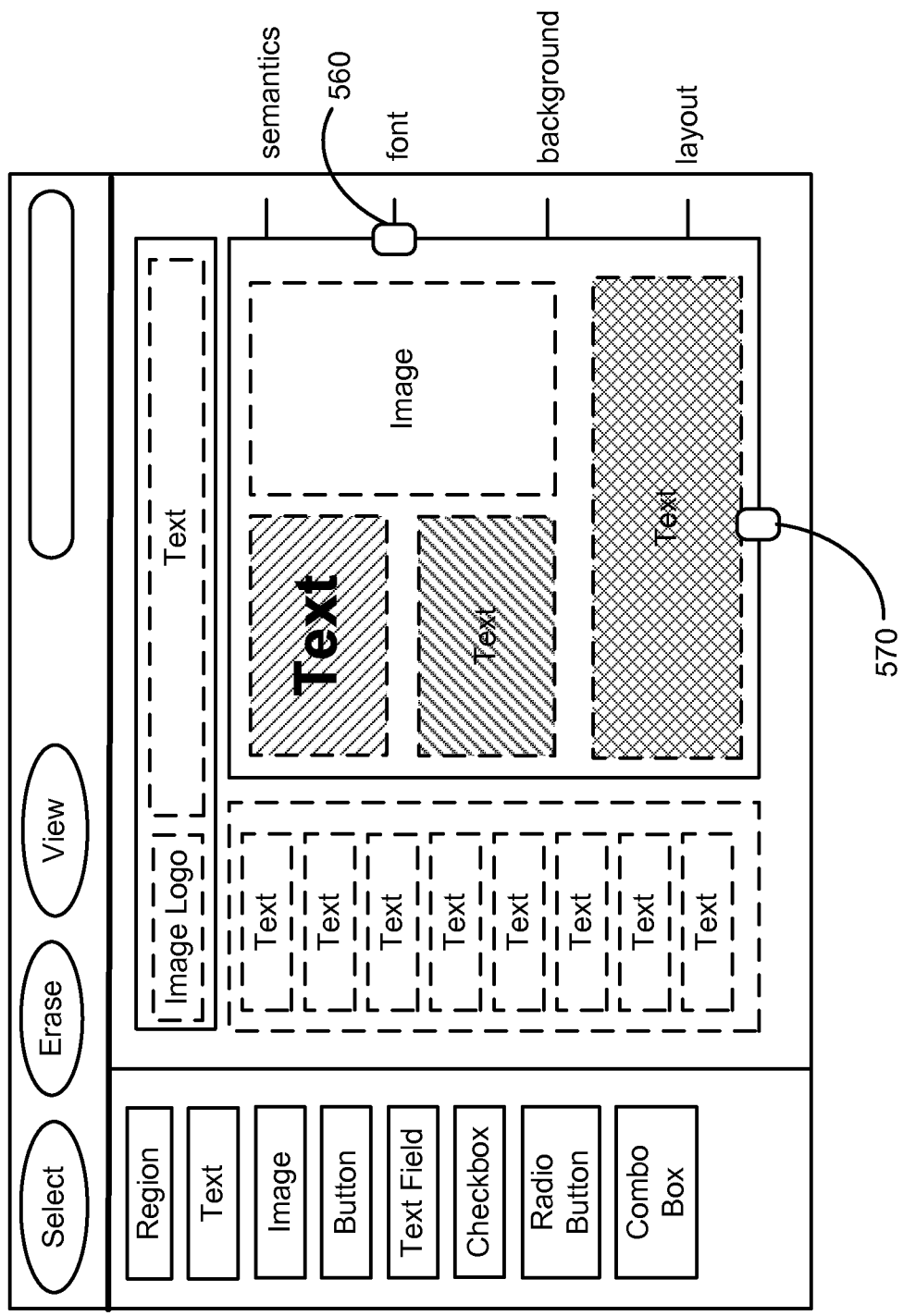
Figure 5G:
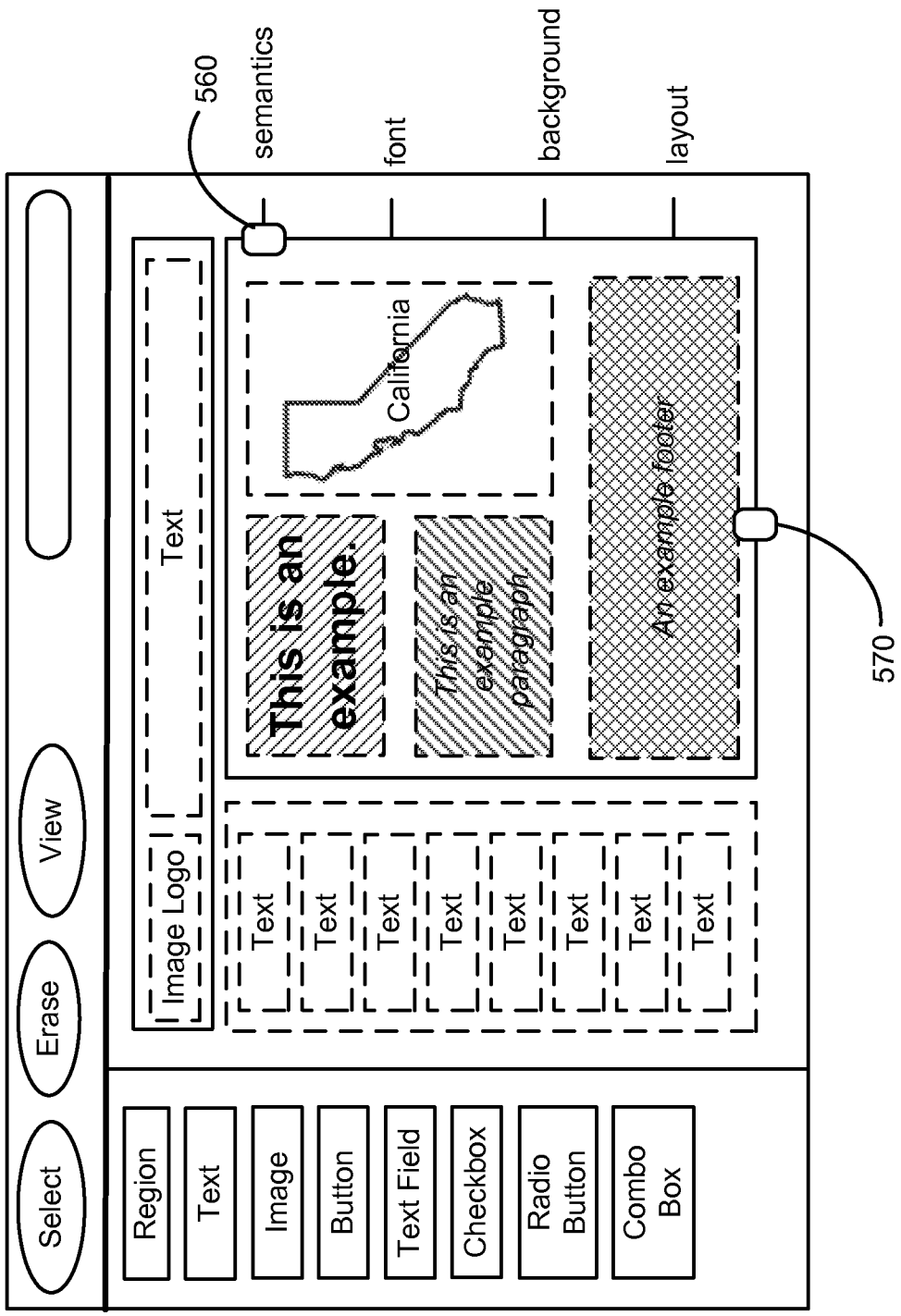

The auto-completion module 320 enables the designer to systematically navigate through the retrieved design examples according to their groupings by interacting with a vertical scrollbar (also called a "detail slider") 560 and a horizontal scrollbar (also called an "example slider") 570, as illustrated in FIG. 5C. The detail slider 560 can be in four detail levels: a layout level, a background level, a font level, and a semantic level. As illustrated in FIG. 5D, starting with the layout level, the designer can scroll the example slider 570 to view the representative design examples of the different layout groups in the selected region. Once the designer finds a desirable layout, the designer scrolls the detail slider 560 to the background level, as shown in FIG. 5E. The designer then scrolls the example slider 570 to view the representative design examples of the different background groups in the selected layout group. Similarly, once the designer finds a desirable background, the designer scrolls the detail slider 560 to the font level, as shown in FIG. 5F. The designer views the representative design examples of the font groups in the selected background group and selects one of the presented options. Finally, once the designer has found a desirable font, the designer scrolls the detail slider 560 to the semantic level as shown in FIG. 5G. The designer views the individual design examples of the selected font group and selects a desirable design (layout, background, font, and/or semantic) to incorporate with the partially completed UI design by selecting the suggest selection button 525. Otherwise, if the designer is not interested in any of the suggested designs, the designer can ignore the suggestions all together by selecting the erase button 527, and add UI components manually through the component menu 530. The UI design application 115 can make further suggestions based on the designer's decision regarding the auto-complete suggestions.

The data store 330 stores data used by the UI design application 115. Examples of such data include information about the partially completed UI design (e.g., attributes of UI components included therein), the UI query generated for the partially completed UI design, and the design examples received for the generated UI query. The data store 330 may be a relational database or any other type of database, or an in-memory data-structure.

Example Architectural Overview of the Server

FIG. 3B is a high-level block diagram illustrating a detailed view of modules within the server 120 according to one embodiment. Some embodiments of the server 120 have different and/or other modules than the ones described herein. Similarly, the functions can be distributed among the modules in accordance with other embodiments in a different manner than is described here. In addition, each module in FIG. 3B may be implemented by a set of computers operating in parallel to further improve efficiency. As illustrated, the server 120 includes a crawling module 350, an indexing module 360, a search engine module 370, a grouping module 380, and a data store 390.

The crawling module 350 creates a design example corpus by retrieving UI contents such as web pages, desktop graphical UI, and ANDROID interface designs. For example, the crawling module 350 visits the web server 130 to systematically retrieve web pages hosted thereon. The crawling module 350 analyzes the harvested design examples to identify UI components included therein and determine attributes of the identified UI components. In one embodiment, the crawling module 350 analyzes the design examples based on the specific formats of the design examples. For example, for a web page in hypertext markup language (HTML), the crawling module 350 analyzes the HTML code of the web page according to the data structure and/or grammar of HTML to identify the UI components of the web page and their attributes. Additionally or alternatively, the crawling module 350 may apply a computer vision-based approach to analyze the UI components of each design example.

The indexing module 360 indexes the design examples retrieved by the crawling module 350 using attributes of UI components included in the design examples. As described above, a design example includes one or more UI components (e.g., regions, texts, images, and buttons), each of which includes attributes (e.g., location, length, height, background, font, and layout) that collectively define the UI component in the design example it belongs to. For example, the background attribute is an integer that represents a color value or a texture identifier of the background of the associated UI component.

In one embodiment, instead of indexing all design examples retrieved by the crawling module 350, the indexing module 360 only indexes a design example if the design example is sufficiently different from any of the already indexed design examples. In cases where a design example is not indexed due to a substantially similar example already having been indexed, the indexing module 360 may increment a count associated with the similar indexed example, thus keeping a record of how common the design is. In one embodiment, the a continuous variable is used for the count and the contribution of any given example to the count is weighted by how closely the existing UI components in the incomplete UI design match with the corresponding components in the example design. For example, if the designer has placed 3 existing UI components, and a first example design contains three identical corresponding UI components, the contribution of the first example may be weighted with a factor of 1. In contrast, a second example design that includes two identical corresponding UI components, but lacks a UI component corresponding to the third existing UI component, may be weighted with a factor of 0.66.

The indexing module 360 measures the differences between a first design example and a second design example by calculating (1) a minimum transformation cost for transforming UI components in the first design example into UI components in the second design example, (2) a minimum transformation cost for transforming UI components in the second design example into UI components in the first design example, and (3) a combination (e.g., average) of the two costs (also called the "combination score"). One example method to calculate the minimum transformation cost is defined in the following equation:

$$Cost = w_a \|additions\| + w_d \|deletions\| + w_g \, geometricCost,$$

where $w_a$ is the weight assigned for each addition operation, ||additions|| is the total number of addition operations, $w_d$ is the weight assigned for each deletion operation, ||deletions|| is the total number of deletion operations, $w_g$ is the weight assigned to the geometric costs defined using the following equation:

$$\text{geometricCost} = w_{translation} \Sigma \text{dis} + w_{scale} \Sigma \text{scaling}.$$

where $w_{translation}$ is the weight assigned for edits corresponding to each edit distance dis, and $w_{scale}$ is the weight assigned for each scaling operation scaling. In the above example, the weights for addition and deletion are different, and as a result the cost function is not symmetric.

For example, if the combination scores for a design example against all indexed design example exceeds a predetermined threshold value, then the indexing module 360 considers the design example sufficiently distinctive and indexes the design example; otherwise the design example is skipped and not indexed (and optionally, a count is incremented, indicating an additional instance of a substantially similar design was identified). In one example, the indexing module 360 simplifies contents from the design example that are unrelated to the graphical design of the UI components (e.g., replacing the actual texts with phrases such as "text", and replacing the actual images with blank images or images with phrases such as "image") before indexing the resulting simplified design examples.

The search engine module 370 receives UI queries from the client 110 and searches for design examples in the indexing module 360. In one embodiment, the search engine module 370 calculates a minimum transformation cost for each indexed design example measuring the similarity between the layout of the UI components specified in the UI query and the layout of the corresponding UI components in the design examples, and retrieves design examples with minimum transformation costs smaller than a predetermined threshold value as the search results for the UI query. For example, the similarity of an example design can be determined by calculating the Hausdorff distances between the UI components in the query and corresponding UI components in the example. The Hungarian method is then used to find the optimal mapping, thus providing an overall distance between the UI components in the query and the corresponding UI components. The relevance of a particular example design is, in some embodiments, estimated by applying a Gaussian density function to the overall distance divided by the number of UI components included in the query.

In one embodiment, given a specific example design $c_i$, and a rectangular area of interest A, the search engine module 370 extracts a set of UI components $e_j$ to recommend from the example such that the bounding box of $e_j$ maximally matches A. The search engine module 270 begins with an empty set as $e_j$ and then repeats the following process. The search engine module 370 searches in $c_i$ for a UI component that has not been added to $e_j$ and maximally overlaps A, by calculating the UI component's intersection with A, relative to its size. If the overlap is over a threshold, and by adding it to $e_j$, the Hausdorff distance between the bounding box of $e_j$ and A does not increase significantly, the UI component is added to $e_j$. If there are no more qualified UI components in $c_i$ (e.g., if all UI components have been considered), the search engine module 270 returns $e_j$ that has been found, comprising all UI components that were successfully added. Note that $e_j$ can be empty. The search engine module 270 calculates an estimate for the relevance of the recommended set of UI components $e_j$ for the area of interest A by applying a Gaussian density function to the Hausdorff distance between the bounding box of $e_j$ and A.

The grouping module 380 groups the design examples in the search results for common regions among the design examples. In one embodiment, the grouping module 380 first calculates a combination score for each pair of design examples in the search results, and groups the design example pairs with small combination scores (e.g., comparing to a predetermined threshold value) into a same layout group and separates the design examples in pairs with high combination scores. Similarly, the grouping module 380 quantifies the differences of backgrounds (e.g., color differences) among design examples in a same layout group, and groups the design examples with similar backgrounds into same background groups within that layout group. Similarly, the grouping module 380 quantifies the differences of fonts (e.g., size, style) among design examples in a same background group, and groups the design examples with similar fonts into same font groups within that background group. In some embodiments, the grouping module 380 considers the whole design example or a subset of the UI components therein (e.g., the UI components from the example that are being recommended for inclusion in the incomplete UI design) when grouping the examples, depending on the embodiment. The grouping module 380 returns the grouped design examples and/or recommended UI components to the client 110 as search results of the received UI query.

In another embodiment, where the indexing module 360 does not filter out similar designs at the indexing stage, the grouping module 380 identifies groups of designs that represent a common overall design based on pairs of designs in the group having combination scores lower than a threshold. Example designs may be limited to being in a single group, or may be included in multiple groups, depending on the specific embodiment. The grouping module 380 produces a count of how many designs are in each group, which can be used to rank the groups by how frequently the common overall design appears in the corpus.

The data store 390 stores data used by the server 120. Examples of such data include the design example corpus, the received UI queries, and the grouped design examples in the search results. The data store 390 may be a relational database or any other type of database, or an in-memory data-structure.

Overview of Methodology

Figure 4:
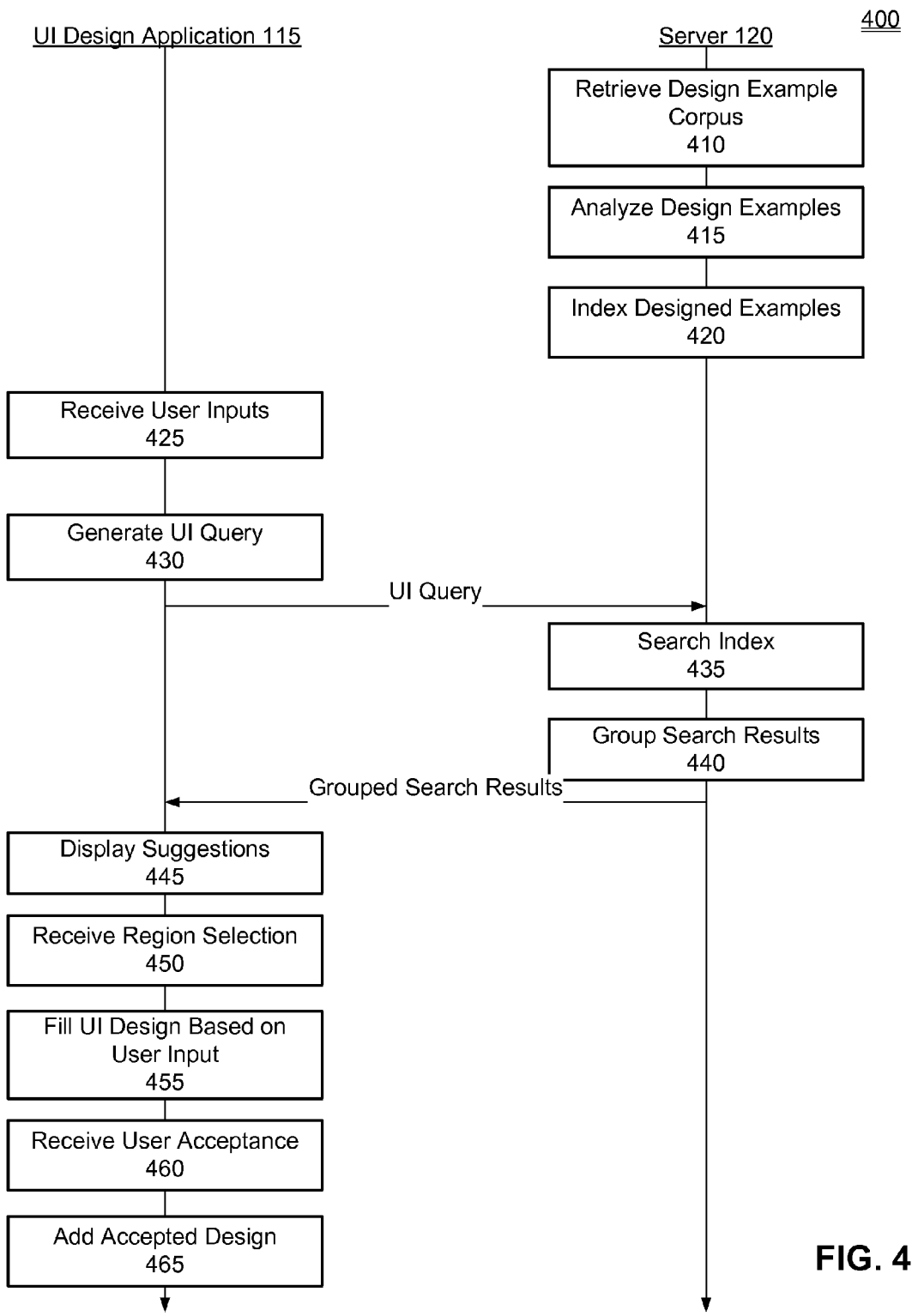
FIG. 4 is a diagram illustrating a process for automatically completing a partially completed UI design created by a designer, according to one embodiment.

FIG. 4 is a time sequence diagram illustrating a process 400 for the UI design application 115 to automatically generate a design for a partially completed UI design, according to one embodiment. Other embodiments can perform the steps of the process 400 in different orders. Moreover, other embodiments can include different and/or additional steps than the ones described herein.

Initially, the server 120 retrieves 410 a large corpus of design examples, for example, by crawling the web server 130 for web pages hosted thereon. The server 120 analyzes 415 the design examples in the corpus to identify UI components included therein and determine the attributes of the identified UI components. The server 120 then indexes 420 the design examples against their UI components in an index.

The UI design application 115 executing on the client 110 receives 425 a user input to create a UI design. The UI design application 115 may receive subsequent user inputs to add one or more UI components on to the partially completed UI design (the existing UI components). An example partially completed UI design is illustrated in FIG. 5A. Referring again to FIG. 4, the UI design application 115 generates 430 a UI query with attributes of the existing UI components, and transmits the UI query to the server 120.

The server 120 receives the UI query and searches 435 in the index for design examples with UI components similar to the existing UI components specified in the UI query. In one embodiment, the server 120 calculates minimum transformation costs between such UI components, and includes design examples with costs less than a predetermined threshold value in search results for the UI query. The server 120 groups (and/or subgroups) 440 the design examples for designs of common regions according to attributes such as layout, UI component type, background, and font, and transmits the grouped design examples to the UI design application 115. Alternatively, the server 120 may transmit an exemplary design from each group to the UI design application 115.

The UI design application 115 displays 445 the layout of a representative design example in one of the layout groups along with the existing UI components to complete the UI design. One exemplary auto-completed UI design is illustrated in FIG. 5B. Referring again to FIG. 4, the UI design application 115 receives 450 a user selection of a region in the automatically completed UI design, and displays a set of user controls for selecting from the example designs, e.g., detail slider 560 and an example slider 570 presented next to the selected region, as illustrated in FIG. 5C. The UI design application 115 fills 455 the selected regions with suggested displays based on user interactions with the user controls. In the embodiment shown in FIG. 5C, the user can scroll the detail slider 560 to control the level of groups (e.g., layout groups, background groups, font groups) to view, and scroll the example slider 570 to navigate through the representative design examples.

In an alternative embodiment, the example designs are ranked and the designer is presented with a single scroll bar for navigating among them. The designer selects a region and is presented with the most highly ranked design example corresponding to the selected region. The designer can use the scroll bar to navigate between options, which are arranged in rank order. Thus, the most popular designs in the corpus are presented to the designer first, as they are more likely to be of interest, but more unusual designs are also presented, should the designer wish to make use of them. In other embodiments, different types of user controls are provided to the designer for navigating through and selecting from the design example.

FIG. 5D illustrates the designer scrolling the example slider to view suggested layouts for the selected region, FIG. 5E illustrates the designer scrolling the example slider to view suggested backgrounds for the selected region, FIG. 5F illustrates the designer scrolling the example slider to view suggested fonts for the selected region, and FIG. 5G illustrates the designer scrolling the example slider to view a specific design example for the selected region.

Referring again to FIG. 4, the UI design application 115 receives 460 a user acceptance for a currently displayed design for the selected region, and adds 465 the design into the partially complete UI design.

Figure 7:
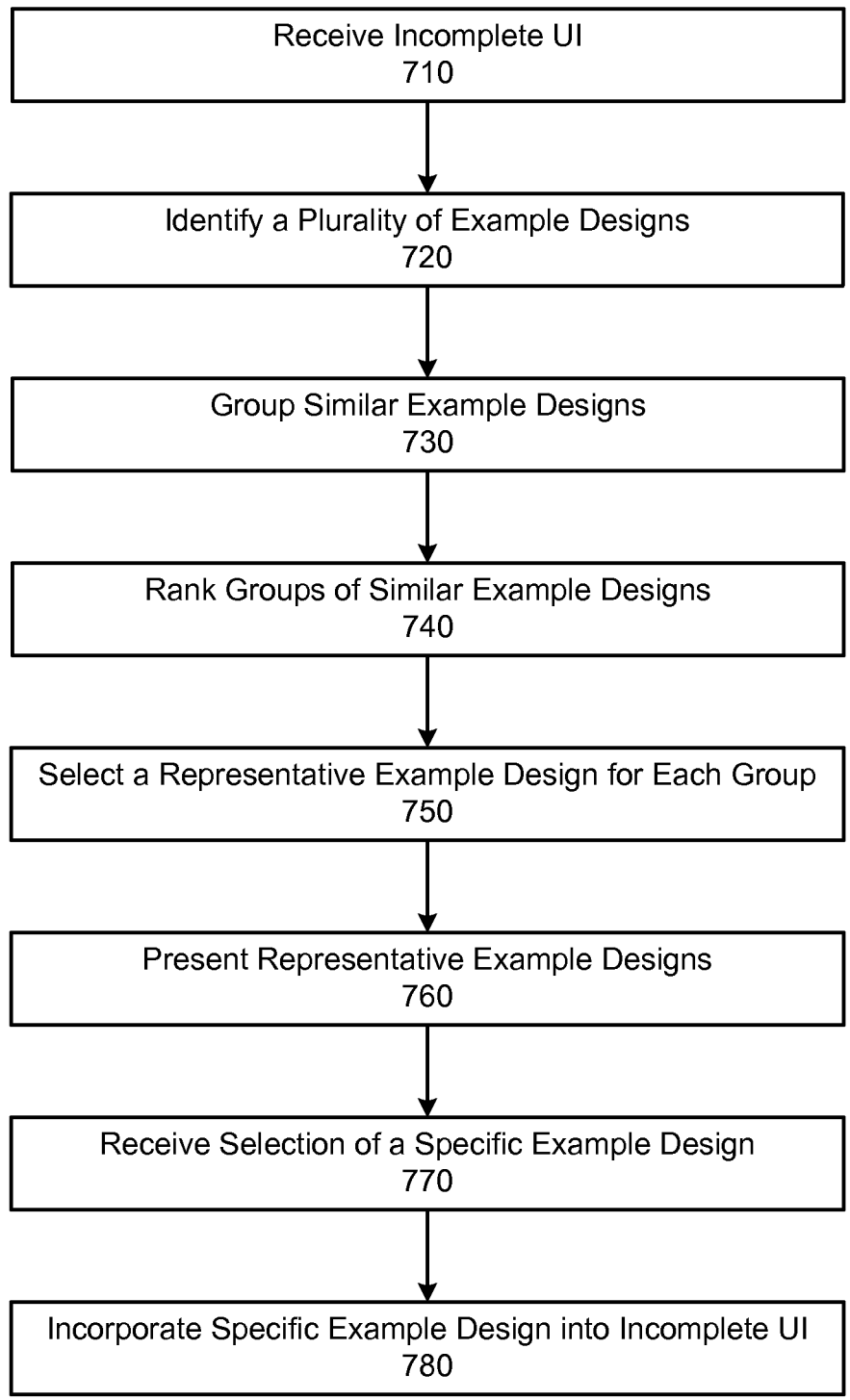
FIG. 7 is a flow-chart illustrating a method for automatically completing a UI design, according to one embodiment.

FIG. 7 is a flow-chart illustrating a method 700 for completing a UI design, according to one embodiment. FIG. 7 attributes the steps of the method 700 to the UI design application 115. However, some or all of the steps may be performed by other entities. In addition, some embodiments may perform the steps in parallel, perform the steps in different orders, or perform different steps.

Initially, in step 710, the UI design application 115 receives an incomplete UI that includes at least one designer added UI component. The incomplete UI is typically generated by the UI design application 115 in response to user input by a designer. Alternatively, the incomplete UI design can be imported from an external source, for example by loading the incomplete UI design from a local or remote storage device 208.

At 720, the UI design application 115 identifies a plurality of example UI designs from a corpus of UI designs. In one embodiment, the UI design application 115 queries an indexed corpus of design examples using the designer added UI components in the incomplete UI as search terms. The returned example designs are those that include UI components that are similar to the designer added UI components, within a threshold degree of tolerance. For example, the UI design application can calculate a transformation cost for the incomplete UI and the example design, as described above with reference to FIGS. 1 and 3B, with only those design examples with a transformation cost below a threshold value being returned in response to the query. In various embodiments, returned example designs can include all of the UI components present in the example, or a subset thereof (e.g., the UI components in the example that correspond to the designer added UI components in the query may be omitted such that the example returned includes just components that are to be recommended for inclusion in the incomplete UI design).

At 730, the UI design application 115 places the identified example designs into groups of similar example designs. The UI design application 115 compares example designs and groups them together if they are substantially similar, e.g., by calculating the transformation cost for a pair of examples and grouping the pair of the transformation cost is below a threshold. In one embodiment, each example design is placed in a single group. In another embodiment, each example design may be placed in multiple groups. For example, if example A is similar to examples B and C, but the difference between B and C exceeds the threshold, a first group containing A and B is created as well as a second group containing A and C.

At 740, the UI design application 115 ranks the identified groups based on the number of example designs included in each. In one embodiment, the groups are ranked in order of how many example designs are included in each group. In another embodiment, the UI design application 115 also considers how closely the existing UI components in the incomplete UI design match with the corresponding components in the example designs in the group (e.g., by considering the transformation scores associated with those components).

At 750, the UI design application 115 selects one of the example designs in each group as representative of the group. The representative example design may be selected in any appropriate manner, such as selecting the design added to the group, selecting the design that yields the lowest average transformation score with respect to the other example designs in the group, selecting a design at random, and the like.

At 760, the UI design application 115 presents one or more of the selected representative example designs to the designer. In one embodiment, the representative example from the highest ranked group is presented first, with the second highest rank example presented if the designer rejects the first presented example (e.g., by pressing the erase button 527 shown in FIGS. 5A-5G). If the designer also rejects the second ranked example, the third ranked example is presented, and so on, until all examples have been presented or the designer selects one to include in the incomplete UI design. In other embodiments, the example designs may be presented in different orders and/or multiple examples may be presented in unison.

At 770, the UI design application 115 receives a selection of one of the presented example designs responsive to user input by the designer. For example, in the embodiment shown in FIGS. 5A-5G, the designer presses the select button 525 and the currently presented example design is selected. At 780, the selected example design is incorporated into the incomplete UI design. In one embodiment, the UI design application 115 inserts all of the UI components into the selected design to the incomplete UI design, except those that correspond to the existing components added to the incomplete UI by the designer (i.e., those that resulted in the selected example design being identified). The added UI components are placed in positions in the incomplete UI design that correspond to their positions in the selected design example. This may require that the UI design application 115 alters the position and/or size of the added UI components, for example if the selected example is larger or smaller than the incomplete UI design.

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for identifying documents sharing common underlying structures in a large collection of documents and processing the documents using the identified structures. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method, system, and storage medium disclosed herein without departing from the spirit and scope of the invention.

What is claimed is:

1. A computer-implemented method of assisting a user to create a user interface (UI), comprising:
    receiving an incomplete UI design, the incomplete UI design comprising a first set of one or more existing UI components;
    identifying a plurality of example designs, each comprising a second set of one or more corresponding UI components, similar to the first set, and one or more additional UI components, wherein identifying comprises calculating a transformation cost associated with each of the plurality of example designs;
    grouping the plurality of example designs into a plurality of groups based on similarities between the additional UI components thereof;
    ranking the plurality of groups based on a number of example designs therein;
    selecting, from each group, a representative example design; and
    providing the representative example designs for presentation to the user in an order based on the ranking, wherein presenting includes providing user controls for the selection of a specific example design for incorporation with the incomplete UI design.

2. The computer-implemented method of claim 1, wherein the ranking for a group is further based on the corresponding transformation costs associated with the example designs therein.

3. The computer-implemented method of claim 1, wherein calculating the transformation cost associated with one of the plurality of example designs comprises:
    calculating, for each existing UI component, a difference score indicating a degree of difference from a corresponding one of the corresponding UI components in the example design; and
    calculating the transformation cost based on the difference scores.

4. The computer-implemented method of claim 3, wherein calculating the transformation cost associated with one of the plurality of example designs further comprises:
    calculating an addition score associated with one of the existing UI components that is not found in the example design, wherein the transformation cost is further based on the addition score.

5. The computer-implemented method of claim 1, wherein grouping the plurality of example designs comprises:
    calculating, for a first example design, a degree of difference between the additional UI components of the first example design and the additional UI components of a second example design; and grouping the first and second example designs responsive to the degree of difference being less than a threshold.

6. The computer-implemented method of claim 1, wherein selecting a representative example design for a group comprises:

calculating, for each example design in the group, a degree of difference from other example designs in the group;

producing, for each example design, a total difference score based on the corresponding example design's degrees of difference from other example designs in the group; and selecting an example design with a lowest total difference score as the representative example design.

7. The computer-implemented method of claim 1, further comprising:

receiving an indication of an incomplete area within the incomplete UI design; and identifying, for each example design, a corresponding area that corresponds to the incomplete area, wherein the additional UI components of each example design are contained within the respective corresponding area.

8. A non-transitory computer-readable medium storing executable computer program code for assisting a user to create a UI, the computer program code comprising instructions for:

receiving an incomplete UI design, the incomplete UI design comprising a first set of one or more existing UI components;

identifying a plurality of example designs, each comprising a second set of one or more corresponding UI components, similar to the first set, and one or more additional UI components, wherein identifying comprises calculating a transformation cost associated with each of the plurality of example designs;

grouping the plurality of example designs into a plurality of groups based on similarities between the additional UI components thereof;

ranking the plurality of groups based on a number of example designs therein;

selecting, from each group, a representative example design; and providing the representative example designs for presentation to the user in an order based on the ranking, wherein presenting includes providing user controls for the selection of a specific example design for incorporation with the incomplete UI design.

9. The non-transitory computer-readable medium of claim 8, wherein the ranking for a group is further based on the corresponding transformation costs associated with the example designs therein.

10. The non-transitory computer-readable medium of claim 8, wherein calculating the transformation cost associated with one of the plurality of example designs comprises:

calculating, for each existing UI component, a difference score indicating a degree of difference from a corresponding one of the corresponding UI components in the example design; and calculating the transformation cost based on the difference scores.

11. The non-transitory computer-readable medium of claim 10, wherein calculating the transformation cost associated with one of the plurality of example designs further comprises:

calculating an addition score associated with one of the existing UI components that is not found in the example design, wherein the transformation cost is further based on the addition score.

12. The non-transitory computer-readable medium of claim 8, wherein grouping the plurality of example designs comprises:

calculating, for a first example design, a degree of difference between the additional UI components of the first example design and the additional UI components of a second example design; and grouping the first and second example designs responsive to the degree of difference being less than a threshold.

13. The non-transitory computer-readable medium of claim 8, wherein selecting a representative example design for a group comprises:

calculating, for each example design in the group, a degree of difference from other example designs in the group;

producing, for each example design, a total difference score based on the corresponding example design's degrees of difference from other example designs in the group; and selecting an example design with a lowest total difference score as the representative example design.

14. The non-transitory computer-readable medium of claim 8, further comprising:

receiving an indication of an incomplete area within the incomplete UI design; and identifying, for each example design, a corresponding area that corresponds to the incomplete area, wherein the additional UI components of each example design are contained within the respective corresponding area.

15. A system for assisting a user to complete an incomplete UI, comprising:

a non-transitory computer-readable medium storing executable computer program code, the computer program code comprising instructions for:

sending, to a server, a query comprising a first set of one or more existing UI components;

receiving, from the server, a plurality of suggested designs based on example designs in a corpus, each suggested design including one or more corresponding UI components, similar to the existing UI components, and one or more additional UI components, the suggested designs ranked based on a frequency with which designs similar to the suggested designs appear in the corpus;

presenting a highest ranked suggested design to the user; and incorporating the additional components of the highest ranked suggested design into the incomplete UI responsive to user input indicating approval of the highest ranked suggested design; and a processor for executing the computer program code.

16. The system of claim 15, wherein the computer program code further comprises instructions for:

presenting a second highest ranked suggested design to the user responsive to user input indicating rejection of the highest ranked suggested design; and incorporating the additional components of the second highest ranked suggested design into the incomplete UI responsive to user input indicating approval of the second highest ranked suggested design.

17. The system of claim 15, wherein the suggested designs are ranked further responsive to a measure of similarity between the existing UI components and the respective corresponding UI components.

18. The system of claim 15, wherein the corresponding UI components and additional UI components of each suggested design are taken from a corresponding one of the example designs in the corpus.

19. The system of claim 18, wherein the query further comprises an indication of an area of interest, the additional UI components of each suggested design being taken from a corresponding area of the respective corresponding example design in the corpus.

20. The system of claim 18, wherein the computer program code further comprises instructions for:
   presenting the corresponding example design in the corpus for a currently displayed suggested design responsive to user input, the presenting comprising visually distinguishing components of the corresponding example design included in the suggested design as at least one of: corresponding UI components and additional UI components.

* * * * *